US009678868B2

(12) United States Patent
Qiu et al.

(10) Patent No.: US 9,678,868 B2
(45) Date of Patent: Jun. 13, 2017

(54) METHOD AND DEVICE FOR OPTIMIZING MEMORY (71) Applicant: Xiaomi Inc., Beijing (CN)

(72) Inventors: Feng Qiu, Beijing (CN); Jianchun Zhang, Beijing (CN); Qiwu Huang, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 14/731,927

(22) Filed: Jun. 5, 2015

(65) Prior Publication Data

US 2016/0124672 A1 May 5, 2016

Related U.S. Application Data

(63) Continuation of application No. PCT/CN2015/074941, filed on Mar. 24, 2015.

(30) Foreign Application Priority Data

Oct. 31, 2014 (CN) .......................... 2014 1 0602435

(51) Int. Cl.
*G06F 3/06* (2006.01)
*G06F 12/08* (2016.01)

(52) U.S. Cl.
CPC .................................. *G06F 12/08* (2013.01)

(58) Field of Classification Search
CPC ...... G06F 12/08; G06F 3/0604; G06F 3/0631; G06F 3/0683; G06F 3/0607; G06F 3/0632

(Continued)

(56) References Cited

U.S. PATENT DOCUMENTS 7,234,047 B1 6/2007 Mahmoud
2005/0232192 A1 10/2005 Rawson, III
(Continued)

FOREIGN PATENT DOCUMENTS

CN 102156675 A 8/2011
CN 103220427 A 7/2013
(Continued)

OTHER PUBLICATIONS

International Search Report of PCT/CN2015/074941, from the State Intellectual Property Office of China, mailed Jul. 30, 2015.
(Continued)

*Primary Examiner* — Jasmine Song
(74) *Attorney, Agent, or Firm* — Finnegan, Henderson, Farabow, Garrett & Dunner LLP (57) ABSTRACT

A method for a device to optimize memory includes: when a newly created process needs to be added into a control group, detecting whether a total resource value of memory resources occupied by all processes in the control group at a current moment reaches a critical resource value; if it is detected that the total resource value of memory resources occupied by all processes in the control group at the current moment reaches the critical resource value, cancelling restriction of the predetermined resource threshold on the control group and adding the newly created process into the control group that is not restricted by the predetermined resource threshold; and performing a swap-out operation on memory resources occupied by an idle process in the control group, so that the total resource value of memory resources occupied by all processes in the control group is less than the predetermined resource threshold.

16 Claims, 5 Drawing Sheets

(58) Field of Classification Search
USPC .................................................. 711/154, 170
See application file for complete search history.

(56) References Cited

U.S. PATENT DOCUMENTS

| | | |
|---|---|---|
| 2012/0297151 A1 | 11/2012 | Kaminaga et al. |
| 2013/0188483 A1* | 7/2013 | Teepell .................. H04L 43/16 370/235 |
| 2013/0290595 A1 | 10/2013 | Weissman et al. |
| 2014/0020085 A1 | 1/2014 | Srour et al. |
| 2014/0059571 A1 | 2/2014 | Watson et al. |
| 2014/0208328 A1* | 7/2014 | Chen ..................... G06F 9/5022 718/103 |

FOREIGN PATENT DOCUMENTS

| | | |
|---|---|---|
| CN | 103226486 A | 7/2013 |
| CN | 103885569 A | 6/2014 |
| CN | 103927230 A | 7/2014 |
| CN | 104102324 A | 10/2014 |
| CN | 104407924 A | 3/2015 |
| JP | 2014199682 A | 10/2014 |
| KR | 1020080052339 | 6/2009 |
| RU | 2166791 C1 | 5/2001 |
| WO | WO 2007/113757 A2 | 11/2007 |
| WO | WO 2009/033166 A1 | 3/2009 |
| WO | WO 2013/161056 A1 | 10/2013 |

OTHER PUBLICATIONS

Agarwal et al., *Swapping out Coordination of Web Processes to the Web Browser*, 2010 Eighth IEEE European Conference on Web Services, pp. 115-122, Dec. 1, 2010.
V. Malik, *Resource limiting using cgroups*, Tech Talk, Sep. 3, 2013, 4 pages.
Extended Search Report for European Application No. EP 15192161.6 from the European Patent Office, dated Mar. 24, 2016.
Official Action dated Sep. 14, 2016 in counterpart Russian Application No. 2015121678/08(033756) and English translation thereof.
English version of International Search Report of PCT/CN2015/074941, from the State Intellectual Property Office of China, mailed Jul. 30, 2015.

* cited by examiner

- 201 When Newly Created Process Needs to Be Added into Control Group, Detect Whether Total Resource Value of Memory Resources Occupied by All Processes in Control Group at Current Moment Reaches Critical Resource Value

- 202 If It Is Detected that Total Resource Value of Memory Resources Occupied by All Processes in Control Group at Current Moment Reaches Critical Resource Value, Cancel Restriction of Predetermined Resource Threshold on Control Group and Add Newly Created Process into Control Group That Is Not Restricted by Predetermined Resource Threshold

- 203 Set Initial Resource Threshold for Control Group, Initial Resource Threshold Being Greater Than Predetermined Resource Threshold

- 204 Detect Whether Total Resource Value of Memory Resources Occupied by All Processes in Control Group Is Greater Than Initial Resource Threshold

- 205 If Total Resource Value Is Less Than Initial Resource Threshold, Decrease Initial Resource Threshold

- 206 If Total Resource Value Is Greater Than Initial Resource Threshold, Perform Swap-Out Operation on Memory Resources Occupied by Idle Process in Control Group

METHOD AND DEVICE FOR OPTIMIZING MEMORY

CROSS-REFERENCE TO RELATED APPLICATIONS

This application is a continuation of International Application No. PCT/CN2015/074941, filed Mar. 24, 2015, which is based upon and claims priority to Chinese Patent Application No. 201410602435.3, filed Oct. 31, 2014, the entire contents of all of which are incorporated herein by reference,

TECHNICAL FIELD

The present disclosure generally relates to the field of computer technologies and, more particularly, to a method and a device for optimizing memory.

BACKGROUND

With more arid more applications operating on a terminal, available memory resources of the terminal become less and less, which may affect operation smoothness of the applications. Therefore, the memory resources of the terminal generally need to be optimized.

Conventionally, when optimizing the memory resources, the terminal arranges a plurality of created processes into one control group, known as Cgroup, and restricts a total resource value of memory resources that can be occupied by the processes in the control group through setting a resource threshold. For example, a process is an instance of a computer program that is being executed. When the terminal needs to add a newly created process into the control group and detects that the total resource value of the control group after adding the newly created process exceeds the resource threshold, a swap-out operation is performed. For example, the terminal transfers data corresponding to an idle process that is not used for a period of time in the control group to a storage device, allocates resources previously occupied by the data to the newly created process, and transfers the data from the storage device to the memory resources occupied by the control group when the idle process is needed again.

SUMMARY

According to a first aspect of the present disclosure, there is provided a method for a device to optimize memory, comprising: when a newly created process needs to he added into a control group, detecting whether a total resource value of memory resources occupied by all processes in the control group at a current moment reaches a critical resource value, the critical resource value being a resource value when the total resource value of memory resources occupied by all processes in the control group at the current moment is less than a predetermined resource threshold but will he greater than the predetermined resource threshold if the newly created process is added into the control group; if it is detected that the total resource value of memory resources occupied by all processes in the control group at the current moment reaches the critical resource value, cancelling restriction of the predetermined resource threshold on the control group and adding the newly created process into the control group that is not restricted by the predetermined resource threshold; and performing a swap-out operation on memory resources occupied by an idle process in the control group, so that the total resource value of memory resources occupied by all processes in the control group is less than the predetermined resource threshold.

According to a second aspect of the present disclosure, there is provided a device, comprising: a processor; and a memory for storing instructions executable by the processor; wherein the processor is configured to: when a newly created process needs to be added into a control group, detect whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group and the total resource value of memory resources occupied by all processes in the control group but will be greater than the predetermined resource threshold if the newly created process is added into the control group; if it is detected that the total resource value of memory resources occupied by, all processes in the control group at the current moment reaches the critical resource value, cancel restriction of the predetermined resource threshold on the control group and add the newly created process into the control group that is not restricted by the predetermined resource threshold; and perform a swap-out operation on memory resources occupied by an idle process in the control group, so that the total resource value of memory resources occupied by all processes in the control group is less than the predetermined resource threshold.

According to a third aspect of the present disclosure, there is provided a non-transitory computer readable storage medium having instructions stored therein that, when executed by a processor in a terminal, cause the terminal to perform a method for optimizing memory, the method comprising: when a newly created process needs to be added into a control group, detecting whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group but will be greater than the predetermined resource threshold if the newly created process is added into the control group; if it is detected that the total resource value of memory resources occupied by all processes in the control group at, the current moment reaches the critical resource value, cancelling restriction of the predetermined resource threshold on the control group and adding the newly created process into the control group that is not restricted by the predetermined resource threshold; and performing a swap-out operation on memory resources occupied by an idle process in the control group, so that the total resource value of memory resources occupied by all processes in the control group is less than the predetermined resource threshold.

It is to be understood that the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
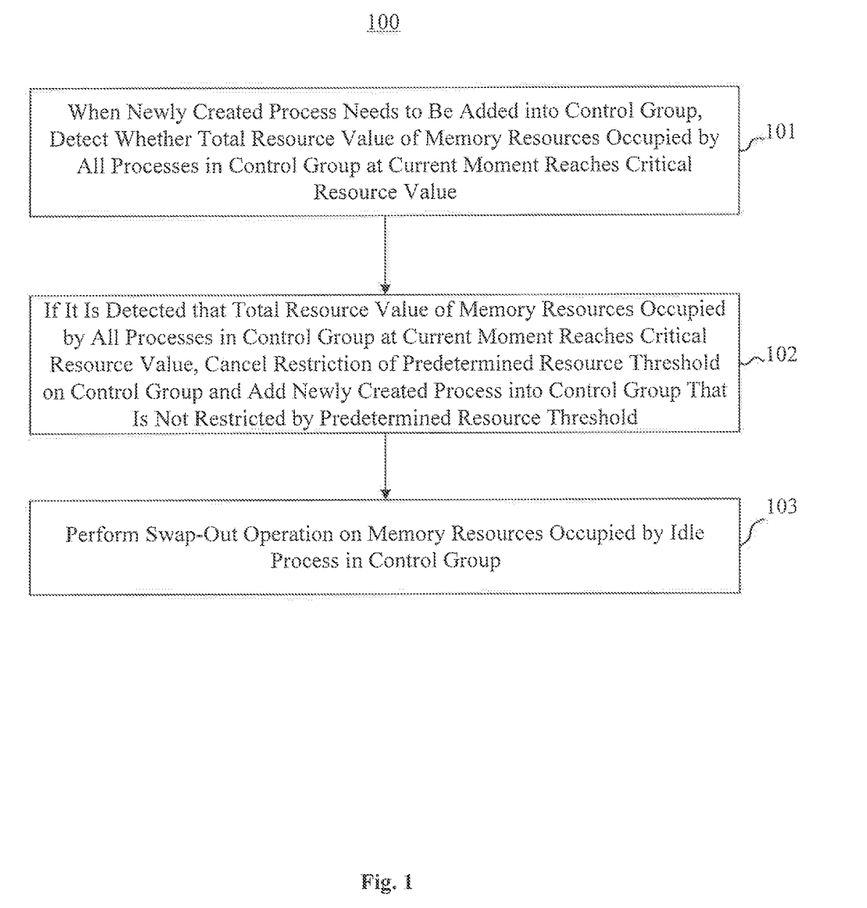
FIG. 1 is a flow chart of a method for optimizing memory, according to an exemplary embodiment.

FIG. 1 is a flow chart of a method 100 for optimizing memory, according to an exemplary embodiment. For example, the method 100 is used in a terminal, such as a mobile phone, a computer, a digital broadcast terminal, a messaging device, a gaming console, a tablet, a medical device, exercise equipment, a personal digital assistant, etc. Referring to FIG. 1, the method 100 includes the following steps.

In step 101, when a newly created process needs to be added into a control group, the terminal detects whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group but will be greater than the predetermined resource threshold if the newly created process is added into the control group.

In the exemplary embodiment, a resource value is a value indicating a size of memory resources, e.g., 500 megabytes (MB).

In the exemplary embodiment, the predetermined resource threshold is a maximum resource value of the total memory resources that can be occupied by all processes in the control group. When the total resource value of memory resources occupied by all processes in the control group is greater than the predetermined resource threshold of the control group, the control group can perform a resource swap-out operation to reduce occupied memory resources.

In step 102, if the terminal detects that the total resource value of memory resources occupied by all processes in the control group at the current moment reaches the critical resource value, the terminal cancels restriction of the predetermined resource threshold on the control group and adds the newly created process into the control group not restricted by the predetermined resource threshold.

When the control group is restricted by the predetermined resource threshold and the total resource value of memory resources occupied by all processes in the control group reaches the critical resource value, the swap-out operation can be performed on memory resources occupied by idle processes in the control group before adding the newly created process into the control group, so as to ensure that the total resource value of memory resources occupied by all processes in the control group after adding the newly created process is less than the predetermined resource threshold. However, performing the swap-out operation before adding the newly created process into the control group may cause a relatively long time delay of the swap-out operation and the adding operation, which affects the operating speed of the terminal, Therefore, in the present embodiment, the terminal cancels restriction of the predetermined resource threshold on the control group and adds the newly created process into the control group not restricted by the predetermined resource threshold, In one exemplary embodiment, the terminal adds the newly created process into another control group that is not restricted by the predetermined resource threshold.

In step 103, a swap-out operation is performed on memory resources occupied by an idle process in the control group, so that the total resource value occupied by all processes in the control group is less than the predetermined resource threshold.

In the exemplary embodiment, after adding the newly created process, since the total resource value of memory resources occupied by all processes in the control group is greater than the predetermined resource threshold, the terminal performs the swap-out operation on the memory resources occupied by the idle process in the control group to reduce occupied memory resources, The swap-out operation is an operation of compressing and transferring data regarding the idle process in the control group to a virtual storage device, By using the method 100, the terminal reduces a time delay when adding the newly created process into the control group.

Figure 2:
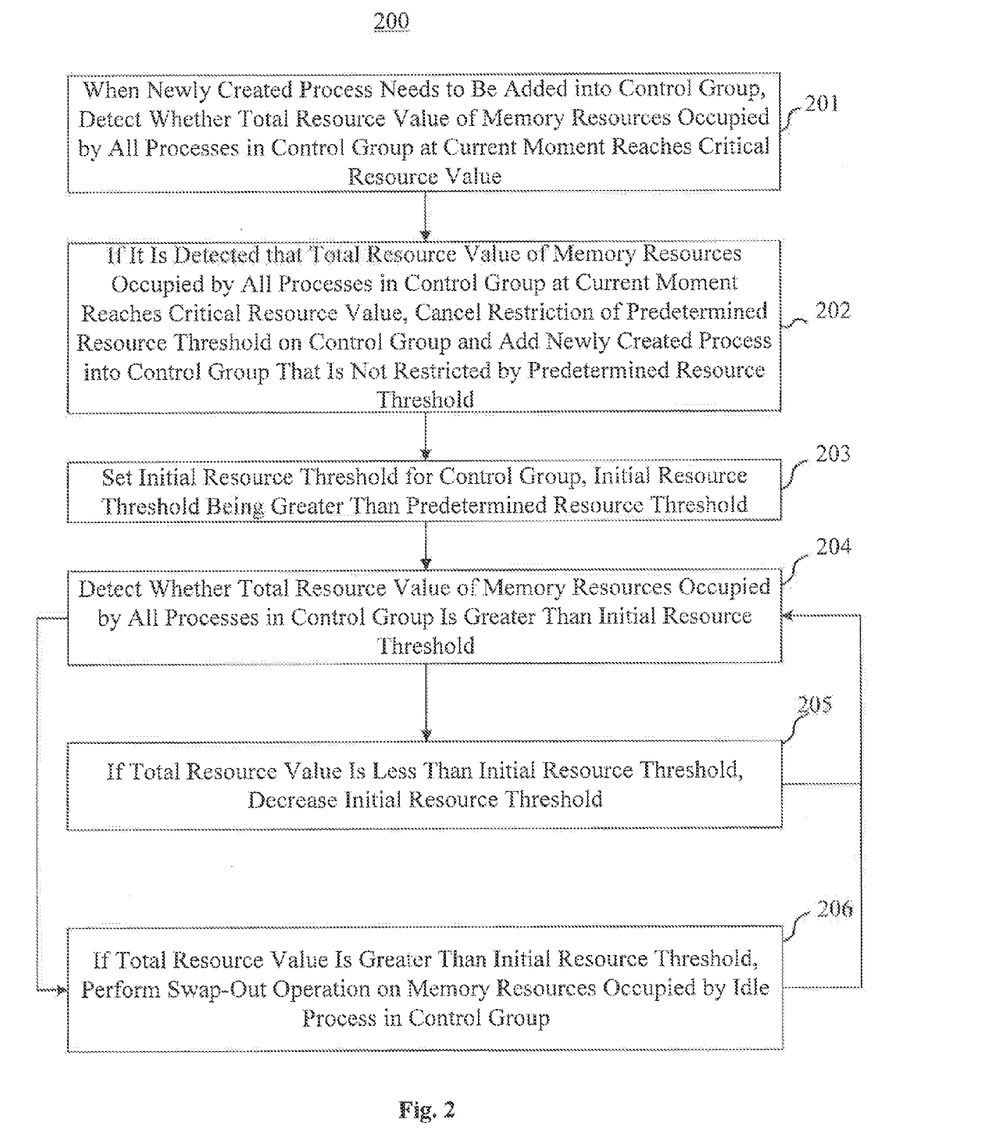
FIG. 2 is a flow chart of a method for optimizing memory, according to an exemplary embodiment.

FIG. 2 is a flow chart of a method 200 for optimizing memory, according to an exemplary embodiment. For example, the method 200 may be used in a terminal, such as a mobile phone, a computer, a digital broadcast terminal, a messaging device, a gaming console, a tablet, a medical device, exercise equipment, a personal digital assistant, etc. Referring to FIG. 2, the method 200 includes the following steps.

In step 201, when a newly created process needs to be added into a control group, the terminal detects whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group and but will be greater than the predetermined resource threshold if the newly created process is added into the control group.

In the exemplary embodiment, a resource value is a value indicating a size of memory resources, e.g., 500 megabytes (MB).

In the exemplary embodiment, the predetermined resource threshold is a maximum resource value of the total memory resources that can be occupied by all processes in the control group. When the total resource value of memory resources occupied by all processes in the control group is greater than the predetermined resource threshold of the control group, the control group can perform a resource swap-out operation to reduce occupied memory resources.

For example, the predetermined resource threshold corresponding to the control group is 500 MB, and the total resource value of memory resources occupied by all processes in the control group, into which the newly created process is to be added, is 480 MB. At this moment, the total resource value (480 MB) is less than the predetermined resource threshold (500 MB). If the newly created process is added, the total resource value of memory resources occupied by all processes in the control group will be 520 MB, which is greater than the predetermined resource threshold (500 MB). Therefore, the critical resource value of the control group is determined to be 480 MB.

In one exemplary embodiment, the control group may be a system control group. The system control group is a control group that is inherent to the terminal system and is restricted by a resource threshold. The terminal may directly read the resource threshold of the system control group, and determine the resource threshold as the predetermined resource threshold corresponding to the control group.

In one exemplary embodiment, the control group may be a non-system control group. The non-system control group is a control group that is created by the terminal and is not restricted by a resource threshold. The terminal may read a resource threshold of a system control group, and determine the resource threshold as the predetermined resource threshold corresponding to the non-system control group. That is, if the control group is a non-system control group, the method 100 may further include reading a resource threshold of a system control group, and determining the resource threshold as the predetermined resource threshold corresponding to the non-system control group.

In step 202, if the terminal detects that the total resource value of memory resources occupied by all processes in the control group at the current moment reaches the critical resource value, the terminal cancels restriction of the predetermined resource threshold on the control group and adds the newly created process into the control group not restricted by the predetermined resource threshold.

When the control group is restricted by the predetermined resource threshold and the total resource value of memory resources occupied by all processes reaches the resource critical value, the swap-out operation can be performed on resources occupied by idle processes in the control group before adding the newly created process into the control group, so as to ensure that the total resource value of memory resources occupied by all processes in the control group after adding the newly created process is less than the predetermined resource threshold. However, performing the swap-out operation before adding the newly created process into the control group may cause a relatively long time delay of the swap-out operation and the adding operation, which affects the operating speed of the terminal. Therefore, in the present embodiment, the terminal cancels restriction of the predetermined resource threshold on the control group and adds the newly created process into the control group not restricted by the predetermined resource threshold.

In exemplary embodiments, the control group not restricted by the predetermined resource threshold may be a control group obtained by cancelling the restriction of the predetermined resource threshold on the system control group, or be a non-system control group that is not restricted by the predetermined resource threshold and is created by the terminal.

In one exemplary embodiment, the control group is a system control group restricted by the predetermined resource threshold. Accordingly, the terminal saves the predetermined resource threshold of the system control group, and cancels the restriction of the predetermined resource threshold on the total memory resources occupied by all processes in the system control group, so that the system control group becomes a control group not restricted by the predetermined resource threshold. The terminal then adds the newly created process into the system control group not restricted by the predetermined resource threshold.

In step 203, an initial resource threshold is set for the control group, the initial resource threshold being greater than the predetermined resource threshold.

In the exemplary embodiment, after adding the newly created process into the control group, since the total resource value of memory resources occupied by all processes in the control group at the current moment is greater than the predetermined resource threshold, the terminal also performs a swap-out operation on the memory resources occupied by idle processes in the control group, to reduce occupied memory resources. For example, the swap-out operation is an operation of compressing and transferring data regarding the idle processes in the control group to a virtual storage device, such as a random access memory (RAM).

In one exemplary embodiment, to reduce the total memory resources occupied by all processes in the control group, and avoid the problem of affecting the operating speed of the terminal caused by frequently performing the swap-out operation due to a relatively small resource threshold, the terminal may set a relatively large initial resource threshold for the control group, continuously decrease the initial resource threshold, and gradually reduce occupied memory resources through decreasing the initial resource threshold.

In step 204, the terminal detects whether the total resource value of memory resources occupied by all processes in the control group is greater than the initial resource threshold.

In the exemplary embodiment, after determining the initial resource threshold, the terminal detects whether the total resource value of memory resources occupied by all processes in the control group is less than the initial resource threshold. If the total resource value is less than the initial resource threshold, which indicates that the initial resource threshold is set overlarge, the initial resource threshold needs to be decreased (step 205). If the total resource threshold is greater than the initial resource threshold, a swap-out operation is performed (step 206).

In step 205, if the terminal detects that the total resource value of memory resources occupied by all processes in the control group is less than the initial resource threshold, the initial resource threshold is decreased, and step 204 is repeated until the initial resource threshold is equal to the predetermined resource threshold and the total resource value of memory resources occupied by all processes in the control group is less than the predetermined resource threshold.

In one exemplary embodiment, the terminal decreases the initial resource threshold to obtain the initial resource threshold after decrease. The initial resource threshold after decrease may be obtained by decreasing the initial resource threshold before decrease by a fixed value, or be obtained through a calculation according to a relationship between the initial resource threshold before decrease and the predetermined resource threshold.

In one exemplary embodiment, when calculating the initial resource threshold after decrease according to the relationship between the initial resource threshold before decrease and the predetermined resource threshold, the terminal acquires a difference between the initial resource threshold after decrease and the predetermined resource threshold, and determines whether the difference is less than a predetermined resource value. If it is determined that the difference is greater than the predetermined resource value, the terminal sets the initial resource threshold after decrease as a new initial resource threshold, and repeats detecting whether the total resource value of memory resources occupied by all processes in the control group is less than the initial resource threshold. If it is detected that the difference is less than the predetermined resource value, the terminal sets the initial resource threshold after decrease as the predetermined resource threshold, and repeats detecting whether the total resource value of memory resources occupied by all processes in the control group is less than the initial resource threshold until the total resource value of memory resources occupied by all processes in the control group is less than the predetermined resource threshold.

For example, the predetermined resource threshold of the control group is 500 MB, the initial resource threshold is 900 MB, and the predetermined resource value is 150 MB, The total resource value of memory resources occupied by all processes in the control group detected by the terminal for a first time is 600 MB. Since the total resource value 600 MB is less than the initial resource threshold 900 MB, the terminal performs an operation of decreasing the initial resource threshold, and determines that the initial resource threshold after decrease is 700 MB according to the following formula: the initial resource threshold after decrease=the initial resource threshold before decrease—(the initial resource threshold before decrease—the predetermined resource threshold)/2. The terminal determines that a difference between the initial resource threshold after decrease (700 MB) and the predetermined resource threshold (500 MB) is 200 MB. Since 200 MB is greater than the predetermined resource value (150 MB), the terminal sets the initial resource threshold to 700 MB, and repeats the detecting of whether the total resource value of memory resources occupied b all processes in the control group is less than the initial resource threshold.

In one exemplary embodiment, the total resource value of memory resources occupied by all processes in the control group detected by the terminal for a second time is 500 MB. Since the total resource value (500 MB) is less than the initial resource threshold (700 MB), the terminal determines that the initial resource threshold after decrease is 600 MB according to the foregoing formula, and acquires a difference of 100 MB between the initial resource threshold after decrease (600 MB) and the predetermined resource threshold (500 MB). Since 100 MB is less than the predetermined resource value (150 MB), the terminal sets the initial resource threshold after decrease as the predetermined resource threshold (500 MB), and repeats the detecting of whether the total resource value of memory resources occupied by all processes in the control group is less than the initial resource threshold until the total resource value of memory resources occupied by all processes in the control group is less than the initial resource threshold.

In one exemplary embodiment, if the terminal detects that the total resource value of memory resources occupied by all processes in the control group is greater than the initial resource threshold all the times during a predetermined detection time period, the terminal repeatedly performs the swap-out operation on the resources occupied by idle processes in the control group within the predetermined detection time period. Since few resources are occupied by the idle processes in the control group when the swap-out operation needs to be repeatedly performed, the swap-out operation may be suspended and performed again when more resources are occupied by the idle processes in the control group, thus avoiding affecting the operating speed of the terminal due to the swap-out operation repeatedly performed on the terminal when there are few idle processes in the control group. Accordingly, occupied memory resources may be gradually reduced through reducing the frequency for performing the swap-out operation, so as to increase the efficiency of reducing occupied memory resources.

Therefore, the terminal may determine an operating error of decreasing the initial resource threshold when detecting that the total resource value of memory resources occupied by all processes in the control group is greater than the initial resource threshold all the time during the predetermined detection time period. Accordingly, the method 200 may further include: 1) if an error occurs while decreasing the initial resource threshold, stopping decreasing the initial resource threshold; and 2) after a predetermined time period, setting the initial resource threshold to the initial resource threshold before decrease, and repeating the detecting of whether the total resource value of memory resources occupied by all processes in the control group is less than the initial resource threshold.

In one exemplary embodiment, the terminal, when detecting that an error occurs while decreasing the initial resource threshold, stops operating a thread of modifying the initial resource threshold within the predetermined time period, determines the initial resource threshold before decrease as the initial resource threshold, and repeats the detecting of whether the total resource value of memory resources occupied by all processes in the control group is less than the initial resource threshold.

For example, the terminal detects that the total resource value of memory resources occupied by all processes in the control group is greater than the initial resource threshold all the time during a predetermined detection time period (3 minutes), then the terminal stops operating the thread of modifying the initial resource threshold, and starts timing. It is assumed that the initial resource threshold before decrease is 900 MB and the predetermined time period is 1 minute, then after the timing reaches 1 minute, the terminal sets the initial resource threshold to the initial resource threshold before decrease (900 MB), and repeats the detecting of whether the total resource value of memory resources occupied by all processes in the control group is less than the initial resource threshold.

In step 206, if the terminal detects that the total resource value of memory resources occupied by all processes in the control group is greater than the initial resource threshold, a swap-out operation is performed on the memory resources occupied by idle processes in the control group, and step 204 is repeated.

In one exemplary embodiment, the terminal detects that the total resource value of memory resources occupied by all processes in the control group is 900 MB. Since the total resource value (900 MB) is greater than the initial resource threshold (500 MB), the terminal performs the swap-out operation on the memory resources occupied by the idle processes in the control group, compresses and stores data regarding the idle processes in the control group onto a virtual device, and repeats the detecting of whether the total resource value of memory resources occupied by all processes in the control group is less than the initial resource threshold.

By using the method 200, the terminal reduces a time delay when adding the newly created process to the control group. Moreover, through stopping decreasing the initial resource threshold when an error occurs, and setting the initial resource threshold to the initial resource threshold before the decreasing after a predetermined time period, the method 200 increases the efficiency of reducing occupied memories.

Figure 3:
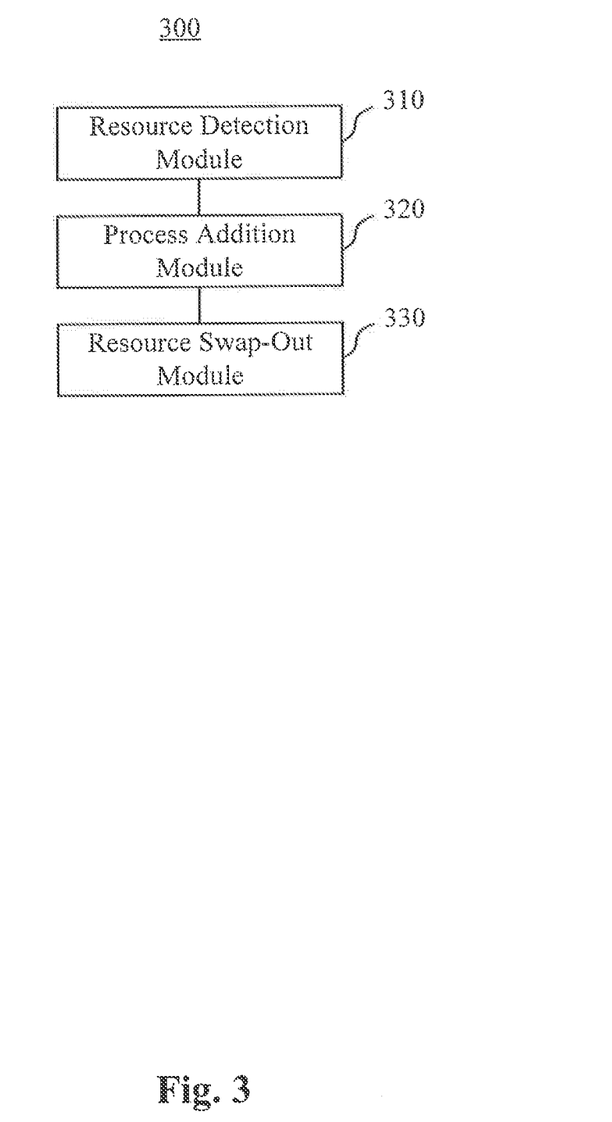
FIG. 3 is a block diagram of a device for optimizing memory, according to an exemplary embodiment.

FIG. 3 is a block diagram of a device 300 for optimizing memory, according to an exemplary embodiment. For example, the device 300 may be a terminal or a part of the terminal. Referring to FIG. 3, the device 300 includes a resource detection module 310, a process addition module 320, and a resource swap-out module 330.

The resource detection module 310 is configured to, when a newly created process needs to be added into a control group, detect whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group but will be greater than the predetermined resource threshold if the newly created process is added into the control group.

The process addition module 320 is configured to, if the resource detection module 310 detects that the total resource value of memory resources occupied by all processes in the control group at the current moment reaches the critical resource value, cancel restriction of the predetermined resource threshold on the control group and add the newly created process into the control group that is not restricted by the predetermined resource threshold.

The resource swap-out module 330 is configured to perform a swap-out operation on memory resources occupied by an idle process in the control group, into which the newly created process is added by the process addition module 320, so that the total resource value of memory resources occupied by all processes in the control group is less than the predetermined resource threshold.

Figure 4:
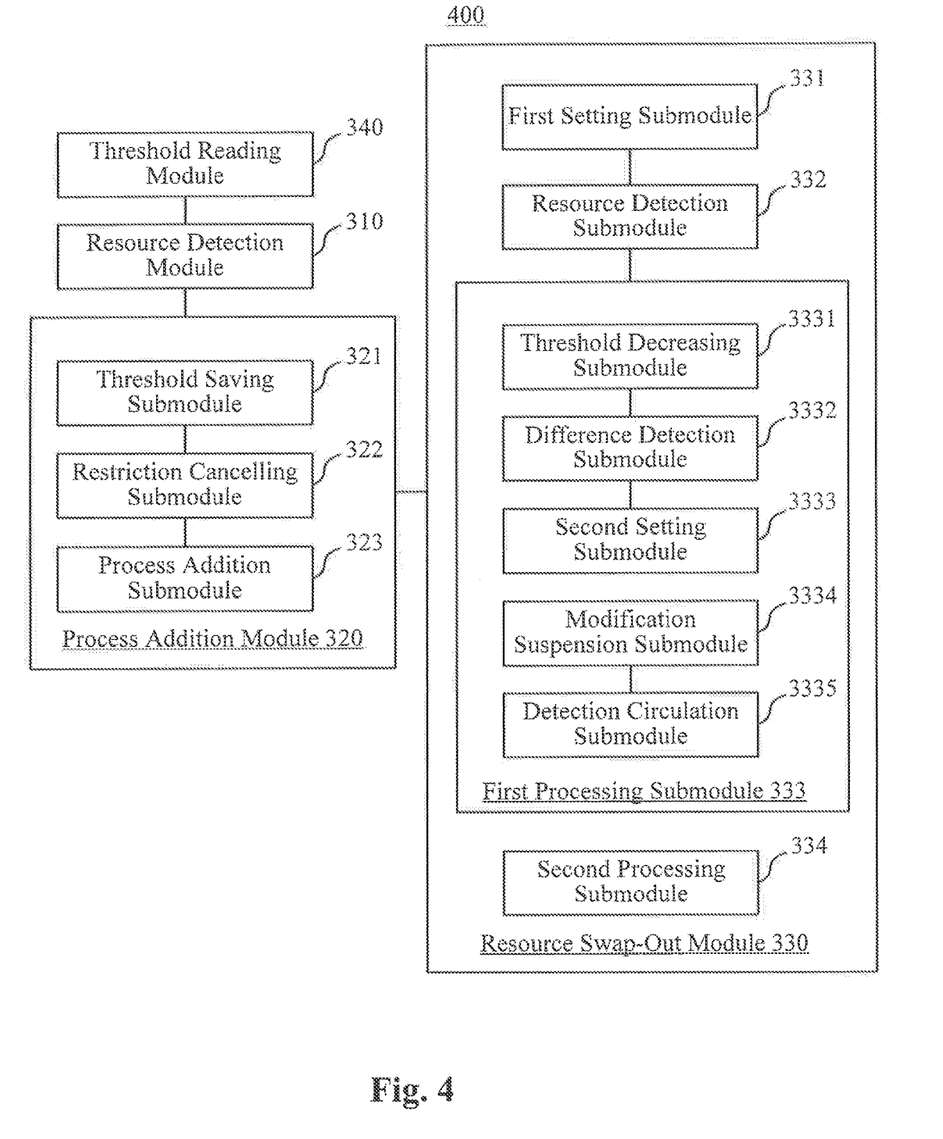
FIG. 4 is a block diagram of a device for optimizing memory, according to an exemplary embodiment.

FIG. 4 is a block diagram of a device 400 for optimizing memory, according to an exemplary embodiment. For example, the device 400 may be a terminal or a part of the terminal. Referring to FIG. 4, the device 400 includes the resource detection module 310, the process addition module 320, and the resource swap-out module 330 (FIG. 3).

In exemplary embodiments, the control group is a system control group restricted by the predetermined resource threshold, and the process addition module 320 includes; a threshold saving submodule 321, a restriction cancelling submodule 322, and a process addition submodule 323.

The threshold saving submodule 321 is configured to save a resource threshold of the system control group as the predetermined resource threshold.

The restriction cancelling submodule 322 is configured to cancel restriction of the predetermined resource threshold on a total resource value of memory resources occupied by all processes in the system control group.

The process addition submodule 323 is configured to add the newly created process into the system control group.

In exemplary embodiments, the control group is a non-system control group, and the device 400 further includes a threshold reading module 340. The threshold reading module 340 is configured to read a resource threshold of a system control group, and determine the resource threshold as the predetermined resource threshold corresponding to the non-system control group.

In exemplary embodiments, the resource swap-out module 330 includes a first setting submodule 331, a resource detection submodule 332, a first processing submodule 333, and a second processing submodule 334.

The first setting submodule 331 is configured to set an initial resource threshold for the control group, the initial resource threshold being greater than the predetermined resource threshold.

The resource detection submodule 332 is configured to detect whether the total resource value of memory resources occupied by all processes in the control group is less than the initial resource threshold set by the first setting submodule 331.

The first processing submodule 333 is configured to, if the resource detection submodule 332 detects that the total resource value of memory resources occupied by all processes in the control group is less than the initial resource threshold, decrease the initial resource threshold, and repeat the detecting of whether the total resource value of memory resources occupied by all processes in the control group is less than the initial resource threshold until the initial resource threshold is equal to the predetermined resource threshold and the total resource value of memory resources occupied by all processes in the control group is less than the predetermined resource threshold.

The second processing submodule 334 is configured to, if the resource detection submodule 332 detects that the total resource value of memory resources occupied by all processes in the control group is greater than the initial resource threshold, perform a swap-out operation on the memory resources occupied by the idle processes in the control group, and repeat the detecting of whether the total resource value of memory resources occupied by all processes in the control group is less than the initial resource threshold.

In exemplary embodiments, the first processing submodule 333 includes a threshold decreasing submodule 3331, a difference detection submodule 3332, and a second setting submodule 3333.

The threshold decreasing submodule 3331 is configured to decrease the initial resource threshold.

The difference detection submodule 3332 is configured to detect whether a difference between the initial resource threshold after being decreased by the threshold decreasing submodule 3331 and the predetermined resource threshold is less than a predetermined resource value.

The second setting submodule 3333 is configured to, if the difference detection submodule 3332 detects that the difference is less than the predetermined resource value, set the initial resource threshold after decrease as the predetermined resource threshold, and repeat the detecting of whether the total resource value of memory resources occupied by all processes in the control group is less than the initial resource threshold until the total resource value of memory resources occupied by all processes in the control group is less than the predetermined resource threshold.

In exemplary embodiments, the first processing submodule 333 further includes a modification suspension submodule 3334 and a detection circulation submodule 3335.

The modification suspension submodule 3334 is configured to, when an error occurs while decreasing the initial resource threshold, stop decreasing the initial resource threshold.

The detection circulation submodule 3335 is configured to, after a predetermined time period, set the initial resource threshold to the initial resource threshold before decrease, and repeat the detecting of whether the total resource value of memory resources occupied by all processes in the control group is less than the initial resource threshold.

Figure 5:
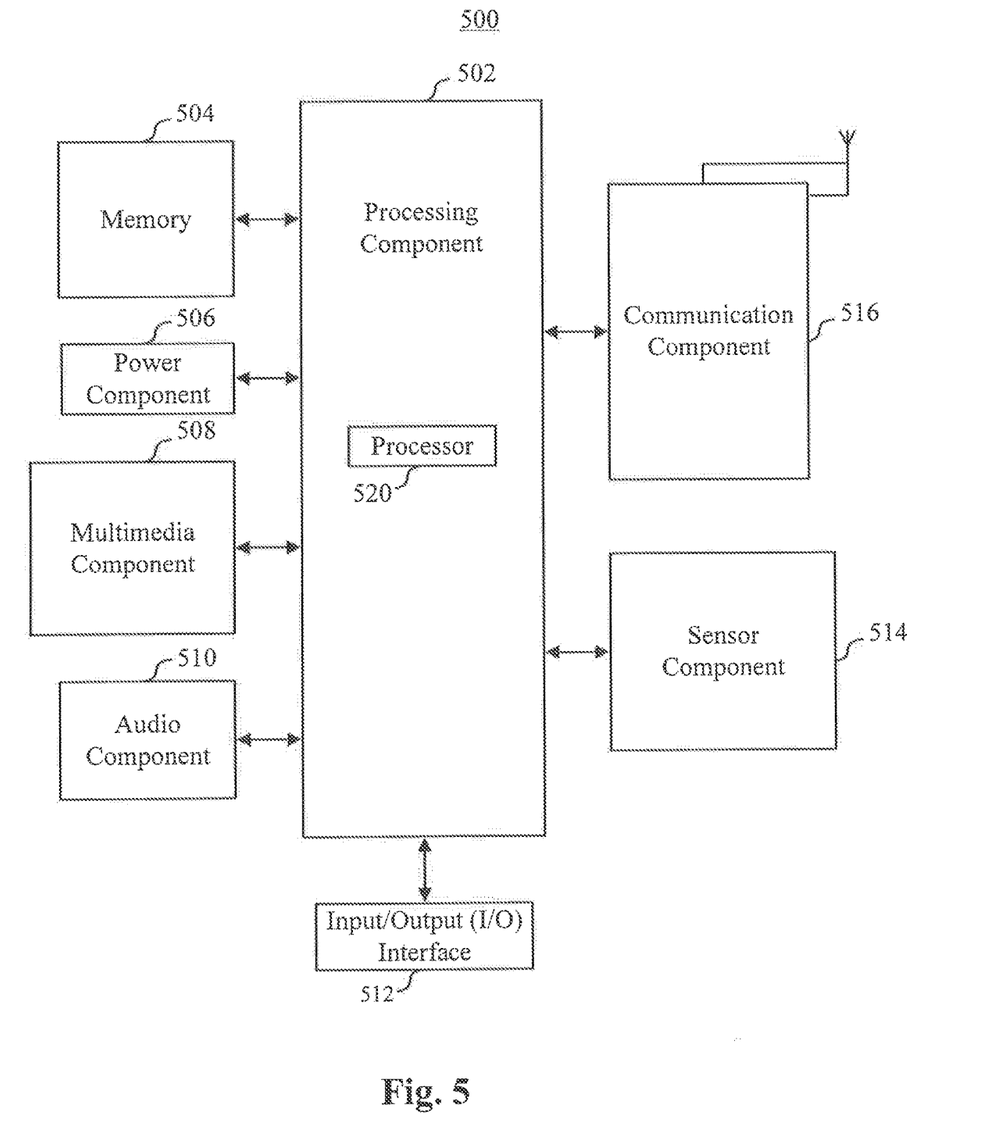
FIG. 5 is a block diagram of a device, according to an exemplary embodiment.

FIG. 5 is a block diagram of a device 500, according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In sonic embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel, The touch sensors may not only sense a boundary of a touch or swipe action, but also sense a period of time and a pressure associated with the touch or swipe action, in some embodiments, the multimedia component 508 includes a front camera and/or a rear camera. The front camera and/or the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In sonic embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact, The sensor component 514 gay also include a light sensor, such as a CMOS or CCD image sensor, for use in imaging applications, In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (DA/B) technology, a Bluetooth (BT) technology, and other technologies.

In exemplary embodiments, the device 500 may be implemented with one or more application specific integrated circuits (ASICs), digital signal processors (DSPS), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the device 500, for performing the above-described methods. For example, the non-transitory computer-readable storage medium may he a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may he combined as one module, and each of the above described modules may he further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art, it is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can he made without departing from the scope thereof.

What is claimed is:

1. A method for a device to optimize memory, comprising:
   when a newly created process needs to he added into a control group, detecting whether a total resource value of memory resources occupied by all processes in the control group at a current moment reaches a critical resource value, the critical resource value being a resource value when the total resource value of memory resources occupied by all processes in the control group at the current moment is less than a predetermined resource threshold but will be greater than the predetermined resource threshold if the newly created process is added into the control group;
   if it is detected that the total resource value of memory resources occupied by all processes in the control group at the current moment reaches the critical resource value, cancelling restriction of the predetermined resource threshold on the control group and adding the newly created process into the control group that is not restricted by the predetermined resource threshold; and
   performing a swap-out operation on memory resources occupied by an idle process in the control group, so that the total resource value of memory resources occupied by all processes in the control group is less than the predetermined resource threshold.

2. The method according to claim 1, wherein if the control group is a system control group restricted by the predetermined resource threshold, the method further comprises:
   saving the predetermined resource threshold of the system control group;
   cancelling restriction of the predetermined resource threshold on a total resource value of memory resources occupied by all processes in the system control group; and
   adding the newly created process into the system control group.

3. The method according to claim 1, wherein if the control group is a non-system control group, the method further comprises;
   reading a resource threshold of a system control group; and
   determining the resource threshold of the system control group as the predetermined resource threshold corresponding to the non-system control group.

4. The method according to claims s, wherein the performing of the swap-out operation on the memory resources occupied by the idle process in the control group comprises:
   setting an initial resource threshold for the control group, the initial resource threshold being greater than the predetermined resource threshold;
   detecting whether the total resource value of memory resources occupied by all processes in the control group is less than the initial resource threshold;
   if it is detected that the total resource value of memory resources occupied by all processes in the control group is less than the initial resource threshold, decreasing the initial resource threshold, and repeating the detecting of whether the total resource value of memory resources occupied by all processes in the control group is less than the initial resource threshold until the initial resource threshold is equal to the predetermined resource threshold and the total resource value of memory resources occupied by all processes in the control group is less than the predetermined resource threshold; and
   if it is detected that the total resource value of memory resources occupied by all processes in the control group is greater than the initial resource threshold, performing the swap-out operation on the memory resources occupied by the idle process in the control group, and repeating the detecting of whether the total resource value of memory resources occupied by all processes in the control group is less than the initial resource threshold.

5. The method according to claim 4, wherein the decreasing of the initial resource threshold, and the repeating of the detecting of whether the total resource value of memory resources occupied by all processes in the control group is less than the initial resource threshold comprise:
   decreasing the initial resource threshold;
   detecting whether a difference between the initial resource threshold after the decreasing and the predetermined resource threshold is less than a predetermined resource value; and
   if it is detected that the difference is less than the predetermined resource value, setting the initial resource threshold after the decreasing as the predetermined resource threshold, and repeating the detecting of whether the total resource value of memory resources occupied by all processes in the control group is less than the initial resource threshold until the total resource value of memory resources occupied by all processes in the control group is less than the predetermined resource threshold.

6. The method according to claim 4, further comprising:
   if an error occurs while decreasing the initial resource threshold, stopping decreasing the initial resource threshold; and
   after a predetermined time period, setting the initial resource threshold to the initial resource threshold before the decreasing, and repeating the detecting of whether the total resource value of memory resources occupied by all processes in the control group is less than the initial resource threshold.

7. The method according to claim 1, further comprising:
   if it is detected that the total resource value of memory resources occupied by all processes in the control group at the current moment reaches the critical resource value, adding the newly created process into another control group that is not restricted by the predetermined resource threshold.

8. A device, comprising:
   a processor; and
   a memory for storing instructions executable by the processor;
   wherein the processor is configured to:
   when a newly created process needs to be added into a control group, detect whether a total resource value of memory resources occupied by all processes in the control group at a current moment reaches a critical resource value, the critical resource value being a resource value when the total resource value of memory resources occupied by all processes in the control croup at the current moment is less than a predetermined resource threshold corresponding to the control group and the total resource value of memory resources occupied by all processes in the control group but win be greater than the predetermined resource threshold if the newly created process is added into the control group;

if it is detected that the total resource value of memory resources occupied by all processes in the control group at the current moment reaches the critical resource value, cancel restriction of the predetermined resource threshold on the control group and add the newly created process into the control group that is not restricted by, the predetermined resource threshold; and perform a swap-out operation on memory resources occupied by an idle process in the control group, so that the total resource value of memory resources occupied by all processes in the control group is less than the predetermined resource threshold.

9. The device according to claim 8, wherein if the control group is a system control group restricted by the predetermined resource threshold, the processor is further configured to:
save the predetermined resource threshold of the system control group;
cancel restriction of the predetermined resource threshold on a total resource value of memory resources occupied by all processes in the system control group; and
add the newly created process into the system control group.

10. The device according to claim 8, wherein if the control group is a non-system control group, the processor is further configured to:
read a resource threshold of a system control group; and
determine the resource threshold of the system control group as the predetermined resource threshold corresponding to the non-system control group.

11. The device according to claims 8, wherein the processor is further configured to:
set an initial resource threshold for the control group, the initial resource threshold being greater than the predetermined resource threshold;
detect whether the total resource value of memory resources occupied by all processes in the control group is less than the initial resource threshold;
if it is detected that the total resource value of memory resources occupied by all processes in the control group is less than the initial resource threshold, decrease the initial resource threshold, and repeat the detecting of whether the total resource value of memory resources occupied by all processes in the control group is less than the initial resource threshold until the initial resource threshold is equal to the predetermined resource threshold and the total resource value of memory resources occupied by all processes in the control group is less than the predetermined resource threshold; and
if it is detected that the total resource value of memory resources occupied by all processes in the control group is greater than the initial resource threshold, perform the swap-out operation on the memory resources occupied by the idle process in the control group, and repeat the detecting of whether the total resource value of memory resources occupied by all processes in the control group is less than the initial resource threshold.

12. The device according to claim 11, wherein the processor is further configured to:
decrease the initial resource threshold;
detect whether a difference between the initial resource threshold after the decreasing and the predetermined resource threshold is less than a predetermined resource value; and
if it is detected that the difference is less than the predetermined resource value, set the initial resource threshold alter the decreasing as the predetermined resource threshold, and repeat the detecting of whether the total resource value of memory resources occupied by all processes in the control group is less than the initial resource threshold until the total resource value of memory resources occupied by all processes in the control group is less than the predetermined resource threshold.

13. The device according to claim 11, wherein the processor is further configured to:
if an error occurs while decreasing the initial resource threshold, stop decreasing the initial resource threshold; and
after a predetermined time period, set the initial resource threshold to the initial resource threshold before the decreasing, and repeat the detecting of whether the total resource value of memory resources occupied by all processes in the control group is less than the initial resource threshold.

14. The device according to claim 8, wherein the processor is further configured to:
if it is detected that the total resource value of memory resources occupied by all processes in the control group at the current moment reaches the critical resource value, add the newly created process into another control group that is not restricted by the predetermined resource threshold.

15. A non-transitory computer-readable storage medium having instructions stored therein that, when executed by a processor in a terminal, cause the terminal to perform a method for optimizing memory, the method comprising:
when a newly created process needs to be added into a control group, detecting whether a total resource value of memory resources occupied by all processes in the control group at a current moment reaches a critical resource value, the critical resource value being a resource value when the total resource value of memory resources occupied by all processes in the control group at the current moment is less than a predetermined resource threshold corresponding to the control group but will be greater than the predetermined resource threshold if the newly created process is added into the control group;
if it is detected that the total resource value of memory resources occupied by all processes in the control group at the current moment reaches the critical resource value, cancelling restriction of the predetermined resource threshold on the control group and adding the newly created process into the control group that is not restricted by the predetermined resource threshold; and
performing a swap-out operation on memory resources occupied by an idle process in the control group, so that the total resource value of memory resources occupied by all processes in the control group is less than the predetermined resource threshold.

16. The non-transitory computer-readable storage medium according to claim 15, wherein the method further comprises:
> if it is detected that the total resource value of memory resources occupied by all processes in the control group at the current moment reaches the critical resource value, adding the newly created process into another control group that is not restricted by the predetermined resource threshold.

\* \* \* \* \*